(12) United States Patent
Radzihovsky et al.

(10) Patent No.: US 11,941,739 B1
(45) Date of Patent: Mar. 26, 2024

(54) OBJECT DEFORMATION NETWORK SYSTEM AND METHOD

(71) Applicant: Pixar, Emeryville, CA (US)

(72) Inventors: Sarah Radzihovsky, Boulder, CO (US); Fernando Ferrari de Goes, Kensington, CA (US); Mark Meyer, San Francisco, CA (US)

(73) Assignee: PIXAR, Emeryville, CA (US)

( * ) Notice: Subject to any disclaimer, the term of this patent is extended or adjusted under 35 U.S.C. 154(b) by 144 days.

(21) Appl. No.: 17/569,396

(22) Filed: Jan. 5, 2022

Related U.S. Application Data

(60) Provisional application No. 63/134,080, filed on Jan. 5, 2021.

(51) Int. Cl.
*G06T 13/40* (2011.01)
*G06N 3/04* (2023.01)
*G06N 3/08* (2023.01)
*G06T 7/70* (2017.01)
*G06T 17/20* (2006.01)

(52) U.S. Cl.
CPC ............... *G06T 13/40* (2013.01); *G06N 3/04* (2013.01); *G06N 3/08* (2013.01); *G06T 7/70* (2017.01); *G06T 17/205* (2013.01); *G06T 2207/20081* (2013.01); *G06T 2207/20084* (2013.01)

(58) Field of Classification Search
CPC ......... G06T 13/40; G06T 7/70; G06T 17/205; G06T 2207/20081; G06T 2207/20084; G06T 17/20; G06T 19/20; G06T 7/75; G06T 17/00; G06N 3/04; G06N 3/08; G06N 3/045; G06N 3/0464; G06V 40/103; G06V 40/20; G06V 20/40; G06F 18/214; G06F 3/016
See application file for complete search history.

(56) References Cited

U.S. PATENT DOCUMENTS

| | | | |
|---|---|---|---|
| 2021/0118239 A1* | 4/2021 | Santesteban | G06Q 10/067 |
| 2021/0350621 A1* | 11/2021 | Bailey | G06T 3/4007 |
| 2023/0024698 A1* | 1/2023 | Koumura | G06N 3/084 |

* cited by examiner

*Primary Examiner* — Xilin Guo
(74) *Attorney, Agent, or Firm* — Kilpatrick Townsend & Stockton LLP

(57) ABSTRACT

Systems and methods generate a modified three-dimensional mesh representation of an object using a trained neural network. A computer system receives a set of input values for posing an initial mesh defining a surface of a three-dimensional object. The computer system provides the input values to a neural network trained on posed meshes generated using a rigging model to generate mesh offset values based upon the set of input values and the initial mesh. The neural network includes an input layer, an output layer, and a plurality of intermediate layers. The computer system generates, by the output layer of the neural network, a set of offset values corresponding to a set of three-dimensional target points based on the set of input values. The offset values are applied to the initial mesh to generate a posed mesh. The computer system outputs the posed mesh for generating an animation frame.

19 Claims, 7 Drawing Sheets

300

RECEIVE A SET OF INPUT VALUES FOR POSING AN INITIAL MESH DEFINING A SURFACE OF A THREE-DIMENSIONAL OBJECT
302

PROVIDE THE SET OF VALUES TO A NEURAL NETWORK TRAINED TO GENERATE A POSED MESH DEFINED IN THREE-DIMENSIONAL SPACE BASED UPON THE SET OF VALUES AND THE INITIAL MESH
304

GENERATE A POSED MESH REPRESENTED BY A SET OF THREE-DIMENSIONAL TARGET POINTS BASED ON THE INPUT VALUES
306

OUTPUT THE POSED MESH FOR GENERATING AN ANIMATION FRAME
308

FIG. 3

OBJECT DEFORMATION NETWORK SYSTEM AND METHOD

CROSS-REFERENCE TO RELATED APPLICATIONS

The present application claims the benefit and priority under 35 U.S.C. 119(e) of U.S. Application No. 63/134,080, filed on Jan. 5, 2021, entitled "FACEBAKER: BAKING CHARACTER FACIAL RIGS WITH MACHINE LEARNING," the content of which is herein incorporated by reference in its entirety for all purposes.

BACKGROUND

With the widespread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Virtual objects can be sculpted much like real clay or plaster, working from general forms to specific details, for example, with various sculpting tools. Models may then be constructed, for example, out of geometrical vertices, faces, and edges in a 3D coordinate system to represent the virtual objects. These models can then be manipulated using computers to, for example, simulate physics, design aesthetic actions such as poses or other deformations, crate lighting, coloring and paint, or the like, of characters or other elements of a computer animation display.

One core functional aspect of computer graphics is to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects such as characters, props, backgrounds, or the like, as models to be used in the rendered image or animation sequence. In some instances, the geometric description of an object may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images can be the balancing of a desire for a highly-detailed image of a character or other object with the practical issues involved in allocating the resources (both human and computational) required to produce those visually appealing images.

Rigs can be used to deform the shape of an object based on a set of rig-control variables. These rigs can be highly complex, particularly for film-quality facial rigs. As a result, traditional rig control techniques are computationally expensive and slow to evaluate. Accordingly, there is a need to overcome the drawbacks and deficiencies in the art.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Systems, devices, and methods are provided for approximating mesh deformations using machine learning. Deformations that would result from a standard rig are approximated using a machine learning model such as a neural network. For example, a neural network is trained based on configured rig deformations (e.g., avar inputs and mesh output), with the resulting neural network usable to replace the standard rig controls. The neural network can be considered as "baking" or approximating the rig. This approximated rig can be used to render an image with the desired modifications. These techniques can reduce rig computations, improve computational speed, remove the need for rig upkeep, and facilitate the portability of rigs.

In some embodiments, a computer-implemented method includes performing steps by a computer system including receiving a set of input values for posing an initial mesh defining a surface of a three-dimensional object. The computer system provides the set of input values to a neural network trained based upon training posed meshes generated using a rigging model to generate mesh offset values defined in three-dimensional space based upon the set of input values and the initial mesh. The neural network includes an input layer, an output layer, and a plurality of intermediate layers. The computer system generates, by the output layer of the neural network, a set of offset values corresponding to a set of three-dimensional target points based on the set of input values. The computer system applies the offset values to the input mesh to generate a posed mesh and outputs the posed mesh for generating an animation frame.

In some aspects, the neural network is trained by executing the rigging model based upon a set of training values to pose a training input mesh to generate a training deformed mesh. The training values are provided as input to the input layer of the neural network. The system uses output of the neural network to generate a training estimated mesh. Parameters of the neural network are updated to minimize a loss function between the training estimated mesh and the training deformed mesh.

In some aspects, the training is repeated using multiple training deformed meshes corresponding to two or more of: mesh position values generated for an animation using the rigging model; mesh position values generated by manipulating the training input mesh for a predetermined set of poses; mesh position values generated by manipulating a rig-control variable between minimum and maximum values; and mesh position values generated by manipulating a subset of the training input mesh using the rigging model. In some aspects, the training input mesh is substantially the same as the initial mesh.

In some aspects, the intermediate layers of the neural network comprise one or more skip connections. In some aspects, the points of the set of three-dimensional target points are generated substantially simultaneously.

In some aspects, an intermediate layer adjacent to the output layer generates a set of weights and the output layer applies the set of weights to a respective set of blendshapes for generating the offset values for the posed mesh, wherein the set of blendshapes are a subset of possible blendshapes selected using principal component analysis. In some aspects, a width of the intermediate layer adjacent to the output layer is equal to a number of components used for the principal component analysis.

In some aspects, the method is performed in less than about 10 milliseconds. In some aspects, the object is a character and wherein the initial mesh is a facial mesh defining a face of the character.

These and other embodiments of the invention are described in detail below. For example, other embodiments are directed to systems, devices, and computer readable media associated with methods described herein.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 3 is a simplified flowchart of a method for deforming an object using machine learning according to some embodiments.

DETAILED DESCRIPTION

Figure 1:
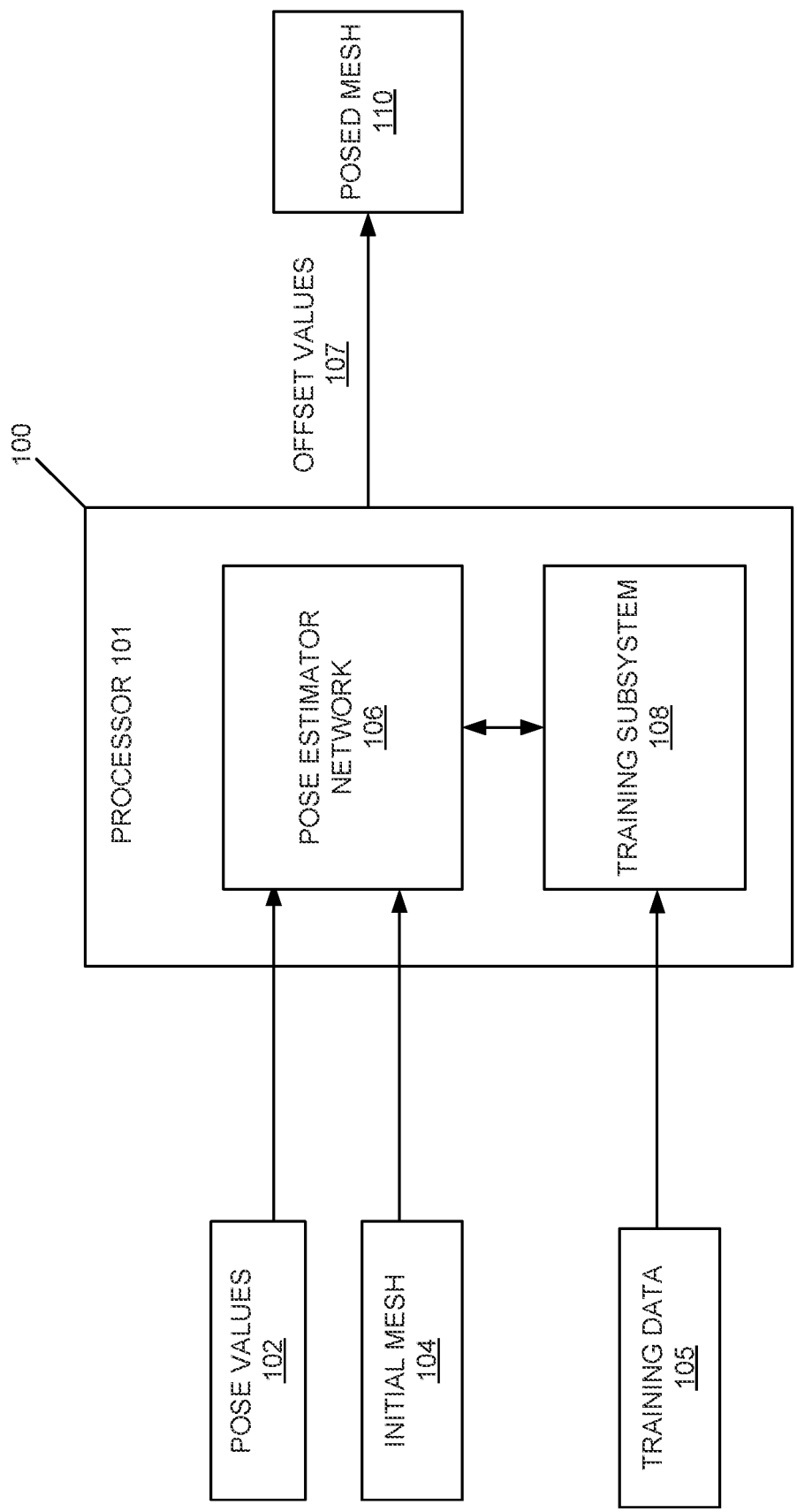
FIG. 1 is a simplified block diagram of a computer system for creating computer graphics imagery (CGI) and computer-aided animation that may implement or incorporate various embodiments or techniques for object deformation using machine learning.

Techniques are described for approximating mesh deformations using machine learning. Deformations that would result from a standard rig are approximated using a machine learning model such as a neural network. For example, a neural network is trained based on configured rig deformations. This modified rig can be used to render an image with the desired modifications.

As noted above, traditional rigs can be highly complex, particularly for film-quality facial rigs, which results in traditional rig controls being computationally expensive and slow to evaluate. Traditional rigging techniques construct a series of rigging representations made up of multiple a three-dimensional transformations from a default position. The rigging representations form a hierarchy where a transform of a child node is the product of its parent transform and its own transform. Each rigging representation may be a polynomial which relies on a series of other polynomials, which makes traditional rigging computationally intensive. Traditional rigging techniques are described in, e.g., Orvalho et al., "A Facial Rigging Survey," *Eurographics* 2012.

The use of film quality rigs in production poses three main challenges. First, high quality character rigs require costly deformation computations to solve for the shape of the character mesh given the animation controls. Second, although there is a desire to use high quality characters outside of proprietary software, it is infeasible to port computationally intensive rigs into external environments. Moreover, film quality rigs are often challenging to technically maintain and therefore difficult to reuse in new projects. Attempts have been made to skeleton from the rig and solve for linear blend skinning weights with a smoothing term to approximate the deformations. These methods suffer drawbacks including an inability to handle facial animation.

Unlike body deformations, face deformations rely mostly on rig controls rather than the underlying skeleton, and each face vertex is affected by a much larger number of rig parameters, leading to a difficult learning problem with a high-dimensional input being mapped to each vertex. Thus, facial deformation is particularly challenging to perform in a fast yet accurate fashion.

The machine learning-based object deformation techniques described herein address these shortcomings and others using a data-driven approach, providing a fast, portable, and long-lasting solution for modifying object poses such as face poses. To quickly approximate a rig while maintaining accuracy and detail preservation, rig functions are approximated using a machine-learning model. For example, set of input avar values and resulting deformed meshes, generated by an initial rig, are used as a training set for a neural network. The neural network predicts offset values for generating a deformed or posed 3D mesh for a given set of avar values and an initial mesh. A last layer of the neural network provides the offset values corresponding to a set of three-dimensional target points. These techniques can reduce rig computations, improve computational speed, remove the need for rig upkeep, and facilitate the portability of rigs.

I. System Overview

Figure 6:
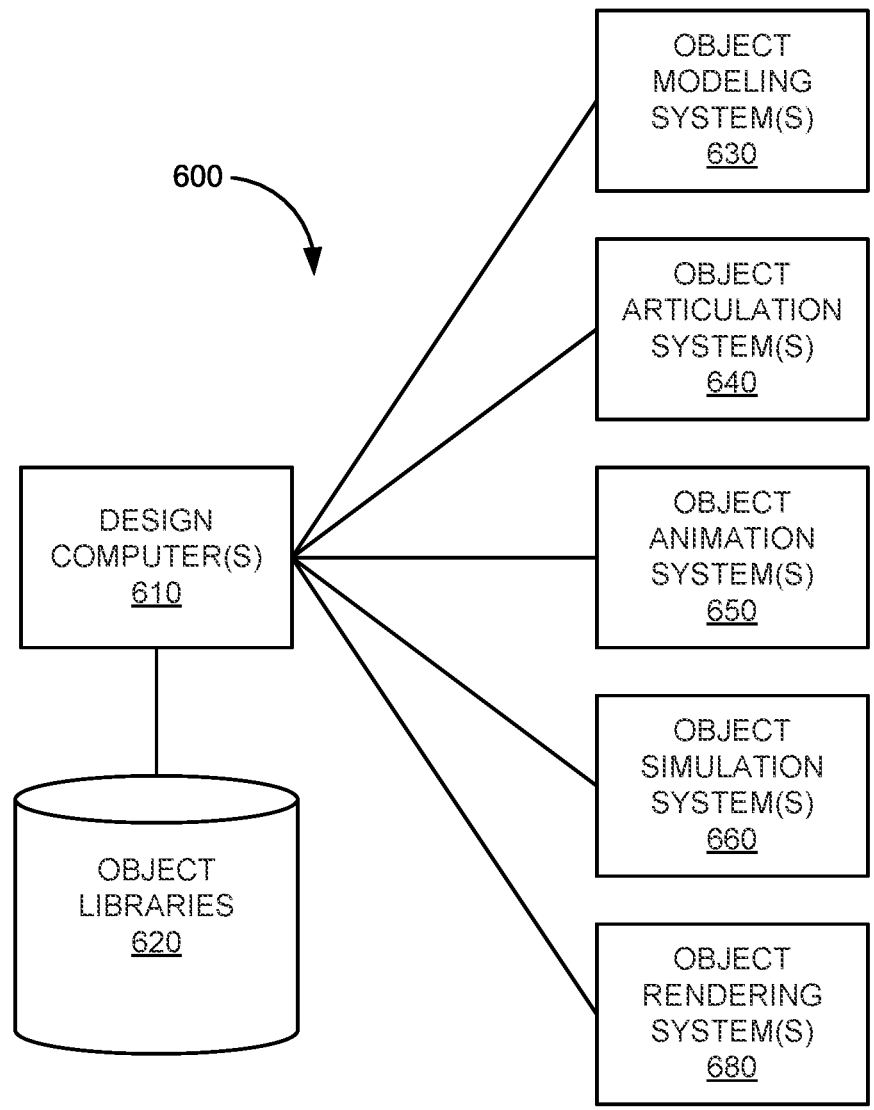
FIG. 6 is a simplified block diagram of a system for creating computer graphics imagery (CGI) and computer-aided animation that may implement or incorporate various embodiments of the present invention.
Figure 7:
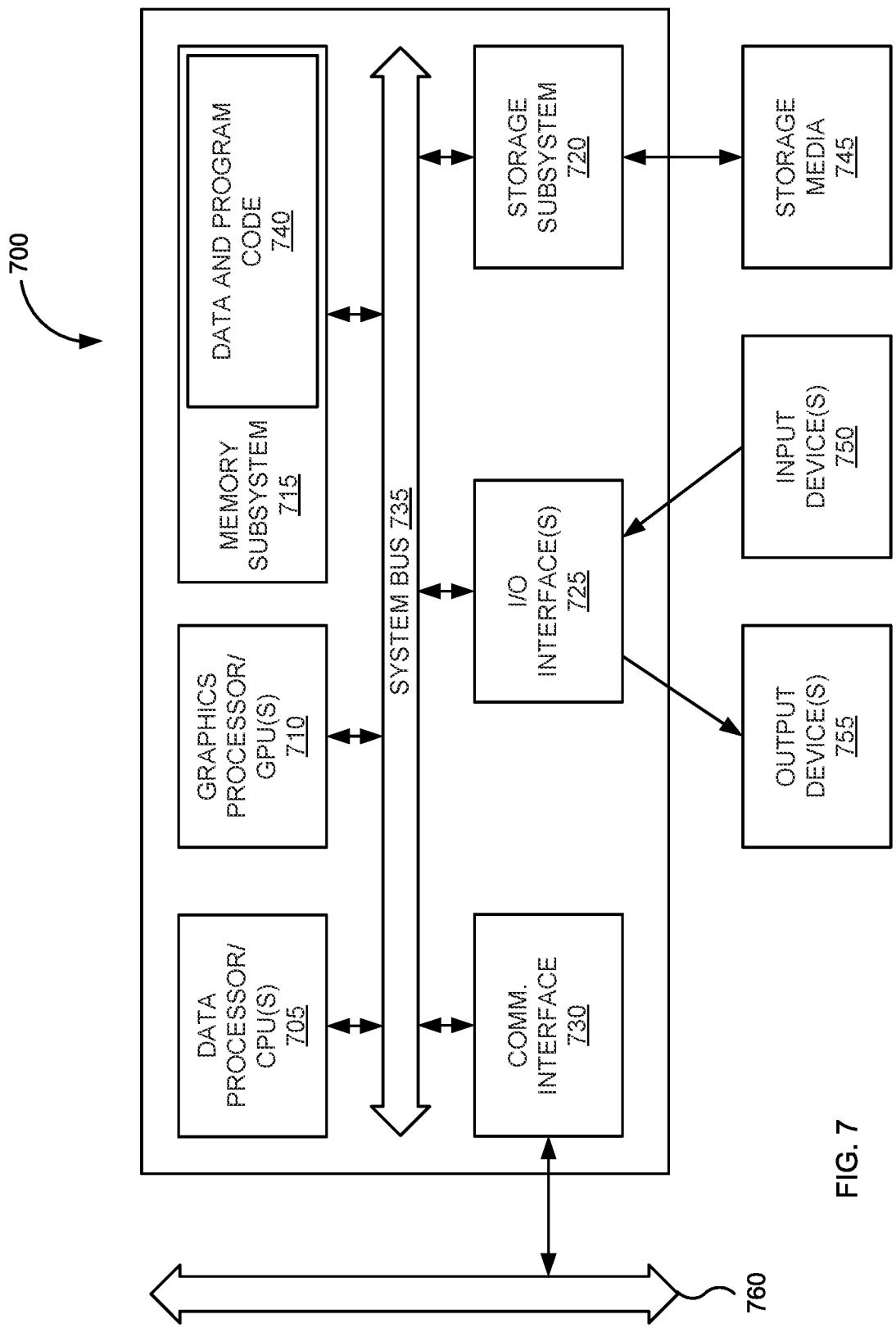
FIG. 7 is a block diagram of a computer system or information processing device that may incorporate an embodiment, be incorporated into an embodiment, or be used to practice any of the innovations, embodiments, and/or examples found within this disclosure.

FIG. 1 is a simplified block diagram of a computer system 100 for creating computer graphics imagery (CGI) and computer-aided animation including objects using machine learning to pose an object. As shown, the computer system 100 can include a processor 101 configured to implement computer program components, which can include an object deformation network 106 and a training subsystem 108. In some implementations, the computer system 100 is part of, or coupled to, systems for animating and rendering objects, as shown in FIGS. 6 and 7. The computer system 100 and its functions may accordingly be part of an overall animation pipeline as further described below with respect to FIGS. 6 and 7.

The processor 101 may receive as input pose values 102 and an initial mesh 104. The pose values 102 can include avars for configuring a pose. An avar is a variable for controlling the position of part of an animated object such as a character. Hundreds or thousands of avars may be used to configure an object such as a character at a given time. Successive sets of avars can control object movement from frame to frame. Avar values may be generated by an animator manually, captured by motion capture, or using other suitable methods. The initial mesh 104 defines a surface of an object. For example, the initial mesh 104 is a polygonal mesh. The object to be modeled can be a human or animal character or another object such as a car, a tree, a piece of furniture, etc. The pose values 102 and initial mesh 104 may be received from one or more components included in, or communicatively coupled to, the computer system 100. For example, the initial mesh 104 and the pose values 102 may be received from an object modeling system 630, as described below with respect to FIG. 6.

The object deformation network 106 is a machine learning model, such as a deep learning neural network, which determines offset values 107 for applying deformations to the initial mesh 104 based upon the pose values 102. The object deformation network 106 generates a set of offset values 107 between the initial mesh 104 and a posed mesh 110 reflecting the deformations. The object deformation network 106 may output offset values 107 for respective points in the initial mesh 104, which are then applied to the initial mesh 104 to generate the posed mesh 110. The posed mesh 110 is a modified version of the initial mesh 104 which changes to the pose according to the pose values 102. For example, an initial mesh 104 may be posed using the pose values 102 and the offset values 105 generated by the object deformation network 106 to change facial expression (e.g., smile, frown, etc.), change body position (e.g., jump, run, bend down, etc.), and so forth. A suitable neural network architecture for the object deformation network 106 is described in further detail below with respect to FIG. 2. Alternatively, other types of machine-learning models may be implemented, such as a U-Net structure that uses an encoder to map from avars to mesh points (in the latent space), then a decoder to map from the latent space of points to avars. In other implementations, a convolutional neural network approach can be used by reducing the 3D mesh to a 2D UV map. The object deformation network 106 may be trained in an initial training phase to approximate mesh deformations using the training subsystem 108.

The training subsystem 108 includes functionality to train the object deformation network 106 using training data 105. The training subsystem 208 trains the object deformation network 106 by applying modifications to a training input mesh, which may be a mesh representing the same object to be deformed at runtime or a mesh representing a different object. The training input mesh is modified using traditional rigging techniques to produce a training deformed mesh for use as ground truth. The object deformation network 106 learns to replicate the deformations generated using the traditional rigging techniques. The training data 105 can include multiple types of training data in some implementations. The training data 105 may include mesh position values generated for an animation using the rigging model, mesh position values generated by manipulating the training input mesh for a predetermined set of poses, mesh position values generated by manipulating a rig-control variable between minimum and maximum values, and/or mesh position values generated by manipulating a subset of the training input mesh using the rigging model. Using the training data, the training subsystem 108 trains the object deformation network 106, as described further below with respect to FIG. 4.

II. Network Architecture

Figure 2:
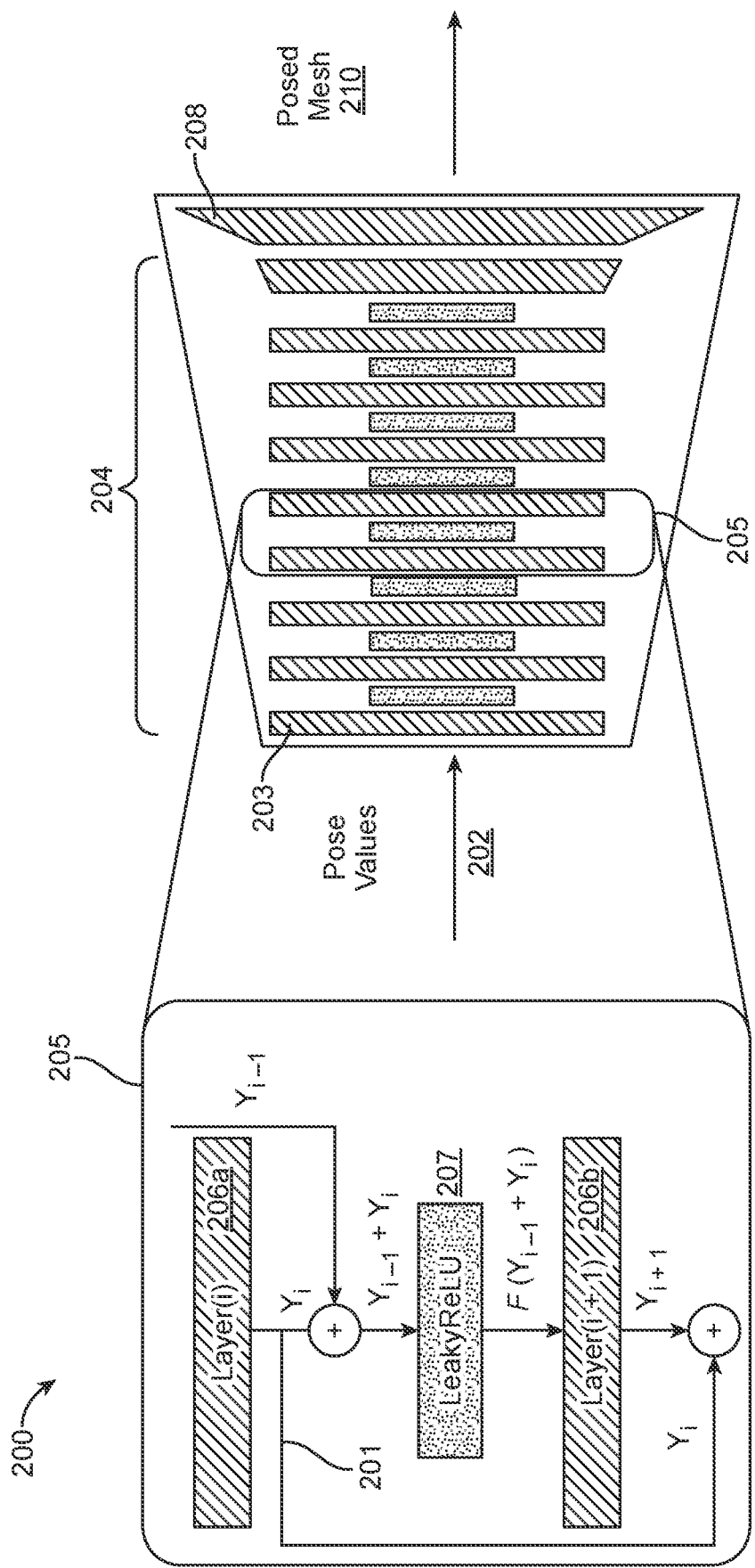
FIG. 2 is a simplified block diagram of a neural network such as that included in the computer system illustrated in FIG. 1.

FIG. 2 is a simplified block diagram of a neural network 200, which may correspond to the object deformation network 106 of the computer system 100 illustrated in FIG. 1. The neural network 200 can be configured to generate a posed mesh 210, or offset values for generating the posed mesh 210, using input pose values 202 (e.g., rig control variables such as avars) as described herein.

In some embodiments, the neural network 200 includes multiple layers. The layers of the neural network 200 include an input layer 203, an output layer 208, and a plurality of intermediate layers 204 positioned between the input layer 203 and the output layer 208. The neural network 200 may have 18 layers, 10 layers, 6 layers, 8 layers, 12 layers, 14 layers, 20 layers, 24 layers, or any other suitable number of layers. In some implementations, the neural network 200 includes 8 dense layers of width 256, a 9th dense layer, and a final dense layer that scales to the size of the deformation representation. The input layer 203 is configured to receive as input the pose values 202, process the pose values 202, and provide an output to a first layer of the intermediate layers 204. The output of the input layer 203 is then processed in turn by each of the intermediate layers 204 and an output of the intermediate layers is provided to the output layer 208, which processes the output of the intermediate layers 204 to produce the output posed mesh 210 or offset values for generating the posed mesh 210. The posed mesh 210 and corresponding offset values may correspond to a set of target points represented in three dimensions.

A portion 205 of the neural network 200 is shown in further detail on the left side of FIG. 2. In some embodiments, the intermediate layers 204 of the neural network 200 include one or more skip connections, such as skip connection 201. The intermediate layers may include Rectified Linear Unit (ReLU) layers. As shown in FIG. 2, Layer i 206a is followed by Leaky ReLU layer 207 which is followed by layer i+1 206b. The skip connection 201 bypasses the Leaky ReLU layer 207. The neural network 200 can include multiple such blocks of layers connected by skip connections bypassing ReLU layers. The skip connections help propagate early signals to deeper layers in order to avoid diminishing gradients. The skip connections help propagate the signal through each layer by adding the signal from $i^{th}$ layer to the signal exiting $(i+1)^{th}$ layer, as shown in FIG. 2.

In some embodiments, a last intermediate layer 206n generates a set of weights for a respective set of blendshapes. Blendshapes are different shapes which can be combined to generate an ultimate posed mesh. For example, a set of head shapes can be combined to generate a face with a certain expression. Blendshapes may consist of a base mesh and a target mesh. A set of blendshapes, representing variations of the mesh in different poses, are used to generate the ultimate posed mesh. The intermediate layer 206n may be adjacent to the output layer 208. The output layer 208 multiplies blendshapes by their corresponding weights to produce weighted blendshapes, which translate to a modified set of three-dimensional points according to the configured pose. In some implementations, the output layer 208 applies the weights to a respective set of blendshapes for generating offset values between points in the initial mesh and points in the posed mesh. A subset of possible blendshapes may be selected using principal component analysis, as further described below with respect to FIGS. 3 and 4. In some implementations, a width of the intermediate layer 206n adjacent to the output layer is equal to a number of components used for the principal component analysis. This causes the amount of weights to correspond to the amount of predetermined blendshapes, so that each blendshape has a corresponding weight.

III. Methods

Figure 4:
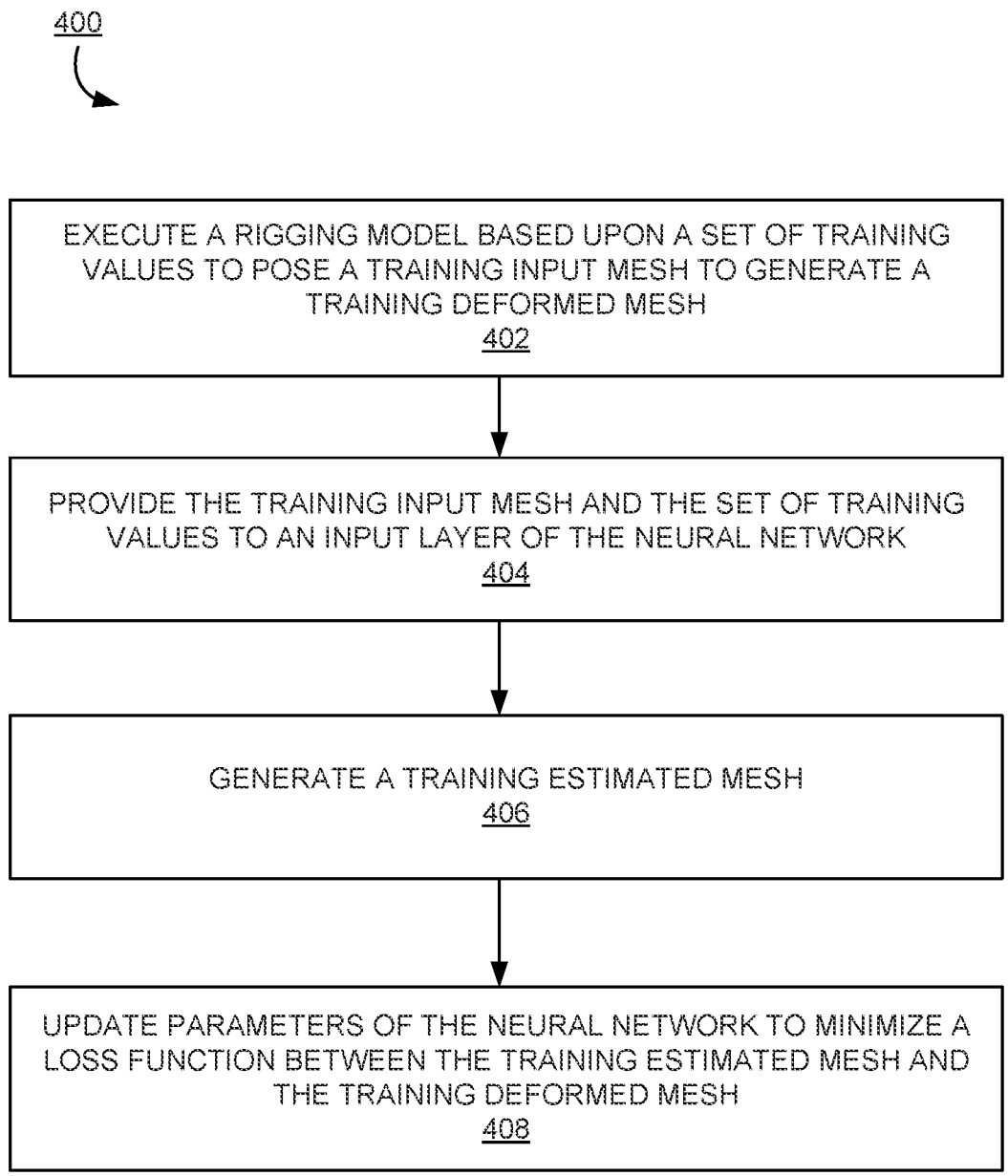
FIG. 4 is a simplified flowchart of a method for training a neural network for object deformation according to some embodiments.

FIGS. 3 and 4 illustrate techniques for executing and training a neural network for generating a modified mesh, according to certain embodiments. FIG. 3 is a flowchart of a method for generating a modified mesh using the neural network at run time. The neural network generates a set of offset values used for generating the modified mesh according to input avars, acting as a rig estimator. Once the modified mesh is generated, an object can be rendered. FIG. 4 is a flowchart of a method for training the neural network to generate the modified mesh. The neural network can be trained based on traditional rig controls to estimate the rig controls at runtime with increased speed and reduced computational requirements.

A. Pose Manipulation Using a Neural Network

FIG. 3 is a simplified flowchart of a method for generating a modified mesh for pose manipulation using a trained neural network according to some embodiments. The method presented in FIG. 3 and described below is intended to be illustrative and non-limiting. It is appreciated that the processing steps may be performed in an order different from that depicted in FIG. 3 and that not all the steps depicted in FIG. 3 need be performed. In certain implementations, the method 300 may be implemented by a computer system, such as the computer system 100 shown in FIGS. 1 and 2 and/or those shown in FIGS. 6 and 7.

In some embodiments, the method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At step 302, the computer system receives a set of input values for posing an initial mesh defining a surface of a three-dimensional object. The input values can be avars establishing different facial expressions, bodily positions, and so forth. The initial mesh may be a polygonal mesh corresponding to a set of points defined in three-dimensional space. In some implementations, the object is a character. The initial mesh can be or can include a facial mesh defining a face of the character. For a facial mesh, there may be greater than 1,000 input values provided to control facial expression. Alternatively, the initial mesh can define the surface of any suitable object for animation. The input values and the initial mesh may be received from an external computing device or another component of the computer system.

At step 304, the computer system provides the set of input values to a neural network (e.g., the object deformation network depicted in FIGS. 1 and 2). The neural network has been trained to generate mesh offset values defined in three-dimensional space based upon the set of input values and the initial mesh. The neural network may have been trained based upon training posed meshes generated using a rigging model, as described below with respect to FIG. 4. As described above with respect to FIG. 2, the neural network may include an input layer, an output layer, and a plurality of intermediate layers. The intermediate layers of the neural network may include one or more skip connections. The input values may be provided to the input layer of the neural network. The initial mesh may also be provided to the neural network (e.g., to the input layer). In some embodiments, batches of input values (e.g., rig-control variables) are provided to the input layer of the neural network, which may be a dense layer of width 256 as described above with respect to FIG. 2.

At step 306, the computer system (e.g., the object deformation network 106 depicted in FIGS. 1 and 2 in cooperation with other components of the computer system) generates a posed mesh represented by a set of three-dimensional target points based on the set of input values. The neural network applies the edits established by the input values to the initial mesh. The mesh deformation may be represented by a per-vertex translation of a mesh from its rest position, relative to object space. Alternatively, or additionally, the neural network may represent mesh deformations in terms of the deformation gradients used to move the mesh from its rest to posed state. In some implementations, the pose values are fed into 8 dense layers of width 256 (including the input layer and the intermediate layers), into an 9th dense layer (e.g., a last intermediate layer), then into the output layer, a final dense layer that scales to the size of the deformation representation. In some implementations, the output layer of the neural network may output offset values for points in the initial mesh. These offset values may then be applied to the initial mesh to generate the posed mesh. Alternatively, in some implementations, the output layer of the neural network generates the posed mesh values directly.

In some embodiments, generating the posed mesh includes generating a set of weights by an intermediate layer of the neural network adjacent to the output layer (e.g., a last intermediate layer, such as the layer 206n shown in FIG. 2). The weights may correspond to a set of blend shapes, such that resulting weighted blendshapes create the pose established by the received input parameters. The last intermediate layer of the neural network passes the weights to the output layer. The output layer applies the set of weights to a respective set of blendshapes for generating the offset values for the posed mesh. For example, the output layer multiplies the weights by respective blendshapes to produce weighted blendshapes. The weighted blendshapes are then added together to represent offset values for the posed mesh.

In some embodiments, the set of blendshapes are a subset of possible blendshapes. For example, the subset of the set of blendshapes are selected using principal component analysis. The weights are fixed to a set of the most important blendshapes selected by Principal Component Analysis (PCA) such that the blendshapes cover 99.9% of the variance in the data. The blendshapes may be established before training, as further described below with respect to FIG. 4. Providing the network with precomputed blendshapes reduces the size and complexity of the problem. Without selecting a subset of blendshapes, there would be a very large amount of blendshapes to add together, which consumes a great deal of time and memory. Thus, using a subset of blendshapes can make the process significantly more efficient while maintaining accurate deformations.

In some embodiments, the points of the set of three-dimensional target points are generated substantially simultaneously. Offset values corresponding to multiple points in the mesh are computed together, which enforces continuity between the points. This can be achieved by virtue of a single-network approach, where the neural network processes the points together to generate the posed mesh.

At step 308, the computer system outputs the posed mesh for generating an animation frame. The computer system may output the posed mesh from the neural network to another system or subsystem, such as the object rendering system(s) 670 and/or the object animation system(s) depicted in FIG. 6.

The computer system or another computing system then generates an animation frame. Generating the animation frame may include generating a texture for the surface of the object and ray tracing between a virtual light source and the three-dimensional volume to render an illuminated object. The computer system may then render the object by converting the color, shape and texture information determined during the ray tracing process into an image. The method 300 described above may be repeated across multiple images which are animated. During animation, the rig of the character can be used to automatically move the character.

In some embodiments, the method 300 is performed in less than about 10 milliseconds. The receiving, providing, generating, and outputting steps of FIG. 3 can be performed in about 5 ms using a 2.3 GHz processor. This is significantly faster than available using traditional rigging techniques. The method 300 also requires significantly less memory and computational resources than traditional rigging techniques. The method 300 can be performed on a device such as a desktop or laptop computer, video game console, or smartphone without the need for high powered processing equipment, in contrast to traditional rigging techniques.

B. Training a Neural Network for Pose Manipulation

Before using the neural network to pose an object at runtime using the method 300 of FIG. 3, the neural network is trained, as described with respect to FIG. 4. The neural network can be trained based on posed meshes generated using a traditional rig, which are used as ground truth to teach the neural network to pose meshes with similar results to traditional rigging techniques.

FIG. 4 is a simplified flowchart of a method 400 for training a neural network as used in the method 300 of FIG. 3 according to some embodiments. The method presented in FIG. 4 and described below is intended to be illustrative and non-limiting. It is appreciated that the processing steps may be performed in an order different from that depicted in FIG. 4 and that not all the steps depicted in FIG. 4 need be performed. In certain implementations, the method 400 may be implemented by a computer system, such as the computer system 100 shown in FIGS. 1 and 2 and/or those shown in FIGS. 6 and 7.

In some embodiments, the method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At step 402, the computer system (e.g., the training subsystem 108 depicted in FIG. 1) generates (or otherwise obtains) a training deformed mesh. In some implementations, the training subsystem 108 generates the training deformed mesh by executing a rigging model based upon a set of training values to pose a training input mesh. The training input mesh can be a mesh to be posed for training. The training input mesh is posed according to the training values (e.g., avars for posing the training input mesh).

The training deformed mesh may be generated by applying modifications to the input training mesh using traditional rigging techniques. The training deformed mesh may be generated by inputting the set of training values (e.g., avars) into a standard rigging model. This produces a ground truth deformed mesh. Traditional rigging techniques that can be used to generate the training deformed mesh are described detail in, e.g., Orvalho et al., supra.

The computer system may use training deformed meshes generated in several different ways to train the neural network to handle avars appropriately. The training may be repeated using multiple training deformed meshes, which in some embodiments are generated in several different fashions. In some embodiments, one or more training deformed meshes correspond to mesh position values generated for an animation using the rigging model. The training deformed meshes may be derived in the course of generating actual film shots. For example, a film or part of a film can be made using traditional rigging techniques, based on a set of avars. These avars, and the resulting training deformed mesh, can be used to train the neural network. By using training data corresponding to actual film shot data, a great deal of training data can be obtained without the need for additional computation and time in deriving the training data. Moreover, using film shots generates many training poses that are likely to be common in the animation process.

Alternatively, or additionally, training deformed meshes may correspond to mesh position values generated by manipulating the training input mesh for a predetermined set of poses. The training deformed meshes may be generated using rig calisthenics, running the mesh through different poses based on different input values. For example, a mesh representing a character body can be deformed to touch toes, jump, and so forth; a mesh representing a character face can be deformed to scrunch the face, smile, frown, wink, and so forth. This produces training deformed meshes with a wide range of poses.

Alternatively, or additionally, the training deformed meshes may correspond to mesh position values generated by manipulating a rig-control variable between minimum and maximum values. Single rig-control excitations can be used to train the model to learn how a particular variable applies in isolation. Single rig-control excitations are created by individually adjusting each rig-control variable uniformly between its minimum and maximum range with some refinement. These excitation shapes help the network decouple the contribution of each rig-control variable from more global facial motions.

Alternatively, or additionally, the training deformed meshes may correspond to mesh position values generated by manipulating a subset of the training input mesh using the rigging model. A subset of the mesh may correspond, for example, to part of a face such as brows, mouth, eyes, and so forth The training values can correspond to moving just the eye or moving just the ear. This can correspond to combinations of regional expressions. Combinations of regional expressions (e.g., for a face, different regions include brows, mouth, eyes, and lids) can supplement the model with examples of localized poses that cannot be recreated by simply combining the shapes created by single rig-control excitations. This helps the neural network detangle which input variables map to which movements. One, two, three, or all of these types of training values may be used to train the neural network.

In some embodiments, the training input mesh is substantially the same as the initial mesh. For example, the neural network is trained on training data specific to a particular character for use in generating meshes for animating that character. The training input mesh and the initial mesh used at runtime may be exactly the same, or of the same object with a slightly different neutral pose. Alternatively, the neural network can be trained using training data corresponding to a different object mesh, multiple object meshes, or any other suitable training data.

At step 404, the computer system (e.g., the training subsystem 108 depicted in FIG. 1) provides the set of training values as input to the input layer of the neural network.

At step 406, the computer system (e.g., the training subsystem 108 depicted in FIG. 1) generates a training estimated mesh. The training estimated mesh is a modified mesh generated by the neural network during training. The neural network may process the training input mesh and the set of training values using the layers of the neural network to generate offset values defined in three-dimensional space via the output layer of the neural network. These offset values are then applied to the training input mesh to generate the training estimated mesh, which may be performed in a similar fashion as described above with respect to step 306 of FIG. 3.

At step 408, the computer system (e.g., the training subsystem 108 depicted in FIG. 1) updates parameters of the neural network to minimize a loss function between the training estimated mesh and the training deformed mesh. The loss function represents differences between the training estimated mesh as generated by the neural network during the training process at step 406 and the training deformed mesh that is the ground truth generated using traditional rigging techniques at step 402. Any suitable loss function may be used to compare the training estimated mesh to the training deformed mesh. In some implementations, the loss function is a function of offset values between the training estimated mesh and the input training mesh, and offset values between the training deformed mesh and the input training mesh. For example, the loss function is a mean square error loss, which takes the mean of the square of the per point difference between offset values between the training estimated mesh and the input training mesh and offset values between the training deformed mesh and the input training mesh'.

The training subsystem may update the parameters of the neural network by adjusting weights corresponding to respective nodes of the neural network. Weights associated with the nodes are updated according to the minimized loss. In some implementations, the training subsystem uses backpropagation to trace the loss back from the output layer through the intermediate layers of the neural network to the input layer. The values of the weights associated with the connections between the nodes in the neural network are thereby updated. The error is backpropagated through the layers by adjusting the weights associated with connections of nodes at each layer. This process is repeated until the output error is below a predetermined threshold. In some implementations, as described below, the final output layer of the neural network has fixed weights set to precomputed blendshapes. In such a case, the output layer is set as non-trainable, and the weights of the output layer of the neural network are not updated in the backpropagation process, although the weights for the other layers are updated.

In some embodiments, the output layer of the neural network is set to generate a predetermined set of blendshapes. These blendshapes may, for example, correspond to a set of head shapes. In some implementations, these blendshapes are selected prior to training, frozen during training, and are not altered as the weights are adjusted. These blendshapes may be derived from the training set before training the network. Using principal component analysis (PCA), a subset of blendshapes are selected (e.g., a top 50 blendshapes out of thousands of blendshapes). PCA is a technique for reducing the dimensionality of large datasets while minimizing information loss. Uncorrelated variables, or principal components are generated that successively maximize variance. (See, e.g., Jolliffe, Ian T, and Jorge Cadima. "Principal component analysis: a review and recent developments." *Philosophical transactions. Series A, Mathematical, physical, and engineering sciences* vol. 374,2065 (2016): 20150202. doi:10.1098/rsta.2015.0202.). For example for a face, there may be thousands of possible blendshapes. A subset of these possible blendshapes is selected, which can still cover, e.g., 99.9% of the shapes if combined together in different ways. By cutting down on the number of blendshapes before training, the model can better converge without the need to focus on extraneous blendshapes. This can speed up the training process, as compared to using all possible blendshapes. Alternatively, the blendshapes can be optimized in the training process. The training process can be simplified and sped up by teaching the neural network to output mesh offset values rather than the final posed points. Example training times are 7-20 hours for characters with 6,000 vertices and 500 rig-control variables.

IV. Example Results

Figure 5:
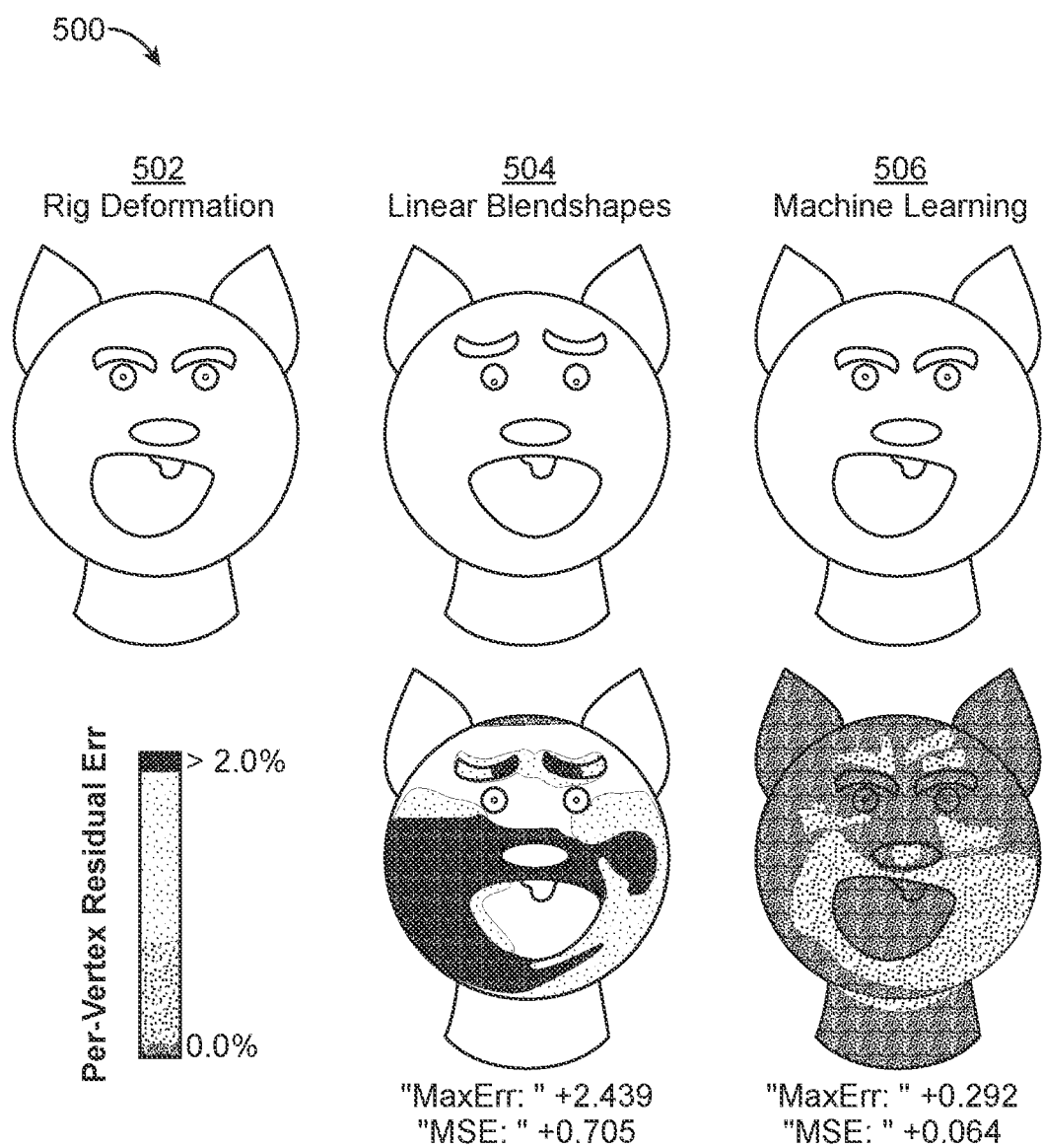
FIG. 5 depicts images illustrating example results using object deformation techniques according to certain embodiments.

FIG. 5 shows images illustrating example results of the techniques described above according to some embodiments. Image 502 represents a simplified example of a posed object generated using a modified mesh created using rig deformation. Rig deformation is the traditional, computationally expensive technique, and provides excellent control over the detail of the face. Rig deformation can be considered a gold standard in terms of quality. But, as noted above, rig deformation can take a relatively long time and require specialized computing devices due to the high computational resources required.

Image 504 represents a simplified example of a posed object generated using a modified mesh created using linear blendshapes. Linear blendshapes is a technique of generating a linear combination of blendshapes. Rather than using a learned non-linear combination of blendshapes (as may be generated by the neural network using the method 300), avars are used to generate a blendshape for each possible modification (e.g., move jaw up 100%, close eye 50%, etc.). The blendshapes for each feature modification are then added together. This technique is faster than the traditional rig approach used to generate image 502, but can fail to account for the interrelation of different features (e.g., if eyes are changed, ideally the cheeks and forehead should change together with the eyes). The per-vertex residual error 508 is shown for linear blendshapes at 510. The image 504 diverges from the image 502 somewhat, with a maximum error of 2.439 and a mean square error of 0.705.

Image 506 represents a simplified example of a posed object generated using a modified mesh created using machine learning as described herein. The per-vertex residual error 508 between image 506 and image 502 is shown below at 512. As shown in FIG. 5, the image 506 generated using the neural network is much more similar to the image 502 generated using traditional rig deformation, as compared to image 504 generated using linear blendshapes. For image 506, the face generally looks the same as in image 502, indicating a very good estimation of the rig pose that would be generated using traditional techniques, with a maximum error of and a mean square error of 0.0604. Thus, the techniques described herein can provide very good results comparable to that using traditional rig deformation, with much lower time, memory, and computational requirements.

Table 1 shows mean squared and maximum approximation errors, proportional to a mesh bounding a box diagonal, for tests on dynamic animations of two character rigs (Character 1 and Character 2). Independent tests evaluate approximations for unseen poses. Dependency tests evaluate predictions for the data used to train the model.

|  | Character 1 | | Character 2 | |
| --- | --- | --- | --- | --- |
|  | Variant | Backlot | Variant | Backlot |
| Independent Test | | | | |
| MSE | 1.54e−3 | 9.66e−5 | 3.75e−4 | 9.84e−6 |
| Max Err | 6.62e−2 | 4.90e−2 | 3.50e−2 | 4.36e−3 |
| Dependency Test | | | | |
| MSE | 4.97e−6 | 6.63e−6 | 7.23e−7 | 3.35e−4 |
| Max Err | 4.77e−3 | 5.87e−3 | 1.64e−3 | 7.76e−2 |

The results shown in Table 1 illustrate the accuracy of the machine learning rig approximations achieved using the techniques described herein. The per point mean squared error of the approximation as well as the largest single vertex error have been computed and compared against the traditional rig deformations and combined linear blendshapes corresponding to each animation control. These results are shown for two applications—rig variant and backlot. For the rig variant application, shot data is not used in the training data. The model used to generate the results shown in Table 1 for variant was trained using three of the four types of input training meshes described above with respect to FIG. 4, excluding the shot data. The techniques described herein lend themselves as an attractive rig variant due to being fast and much more lightweight than most film quality rigs without noticeable loss in deformation quality. Refraining from training on shot data reduces the amount of data the variant model can learn from.

For the backlot application, shot data is used as training and validation data. The model used to generate the results shown in Table 1 for backlot was trained using all four types of input training meshes described above with respect to FIG. 4, including the shot data. The compact and universal nature of the pre-trained model resulting from the approach described herein also serves as a suitable way to preserve a character rig with little maintenance cost, using the backlot approach. The use of shot data as an additional source of data gives this model many more examples to generalize from, enabling the backlot model to, on average, make better predictions than the variant model for poses the model has not yet learned from. On the other hand, more generalization comes at the expense of a reduced ability to overfit. Thus, the results shown in Table 1 show that the variant model's output more closely matches the original rig deformations when the input pose variables closely match that of a training example.

V. Computing Systems

FIG. 6 is a simplified block diagram of system 600 for creating computer graphics imagery (CGI) and computer-aided animation that may implement or incorporate various embodiments. In this example, system 600 can include one or more design computers 610, object library 620, one or more object modeling systems 630, one or more object articulation systems 640, one or more object animation systems 650, one or more object simulation systems 660, and one or more object rendering systems 670. Any of the systems 630-670 may be invoked by or used directly by a user of the one or more design computers 610 and/or automatically invoked by or used by one or more processes associated with the one or more design computers 610. Any of the elements of system 600 can include hardware and/or software elements configured for specific functions.

The one or more design computers 610 can include hardware and software elements configured for designing CGI and assisting with computer-aided animation. Each of the one or more design computers 610 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 610 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 610 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 610 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 610 acting as an animator may employ one or more systems or tools to specify motion and position of one or more objects over time to produce an animation.

Object library 620 can include elements configured for storing and accessing information related to objects used by the one or more design computers 610 during the various stages of a production process to produce CGI and animation. Some examples of object library 620 can include a file, a database, or other storage devices and mechanisms. Object library 620 may be locally accessible to the one or more design computers 610 or hosted by one or more external computer systems.

Some examples of information stored in object library 620 can include an object itself, metadata, object geometry, object topology, rigging, control data, animation data, animation cues, simulation data, texture data, lighting data, shader code, or the like. An object stored in object library 620 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 630 can include hardware and/or software elements configured for modeling one or more objects. Modeling can include the creating, sculpting, and editing of an object. In various embodiments, the one or more object modeling systems 630 may be configured to generated a model to include a description of the shape of an object. The one or more object modeling systems 630 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 630 may further generate model data (e.g., 2D and 3D model data) for use by other elements of system 600 or that can be stored in object library 620. The one or more object modeling systems 630 may be configured to allow a user to associate additional information, metadata, color, lighting, rigging, controls, or the like, with all or a portion of the generated model data.

The one or more object articulation systems 640 can include hardware and/or software elements configured to articulating one or more computer-generated objects. Articulation can include the building or creation of rigs, the rigging of an object, and the editing of rigging. In various embodiments, the one or more articulation systems 640 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 640 may further generate articulation data (e.g., data associated with controls or animations variables) for use by other elements of system 600 or that can be stored in object library 620. The one or more object articulation systems 640 may be configured to allow a user to associate additional information, metadata, color, lighting, rigging, controls, or the like, with all or a portion of the generated articulation data.

The one or more object animation systems 650 can include hardware and/or software elements configured for animating one or more computer-generated objects. Animation can include the specification of motion and position of an object over time. The one or more object animation systems 650 may be invoked by or used directly by a user of the one or more design computers 610 and/or automatically invoked by or used by one or more processes associated with the one or more design computers 610.

In various embodiments, the one or more animation systems 650 may be configured to enable users to manipulate controls or animation variables or utilized character rigging to specify one or more key frames of animation sequence. The one or more animation systems 650 generate intermediary frames based on the one or more key frames. In some embodiments, the one or more animation systems 650 may be configured to enable users to specify animation cues, paths, or the like according to one or more predefined sequences. The one or more animation systems 650 generate frames of the animation based on the animation cues or paths. In further embodiments, the one or more animation systems 650 may be configured to enable users to define animations using one or more animation languages, morphs, deformations, or the like.

The one or more object animations systems 650 may further generate animation data (e.g., inputs associated with controls or animations variables) for use by other elements of system 600 or that can be stored in object library 620. The one or more object animations systems 650 may be configured to allow a user to associate additional information, metadata, color, lighting, rigging, controls, or the like, with all or a portion of the generated animation data.

The one or more object simulation systems 660 can include hardware and/or software elements configured for simulating one or more computer-generated objects. Simulation can include determining motion and position of an object over time in response to one or more simulated forces or conditions. The one or more object simulation systems 660 may be invoked by or used directly by a user of the one or more design computers 610 and/or automatically invoked by or used by one or more processes associated with the one or more design computers 610.

In various embodiments, the one or more object simulation systems 660 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 660 may be used to simulate the behavior of objects, such as hair, fur, and cloth, in response to a physics model and/or animation of one or more characters and objects within a computer-generated scene.

The one or more object simulation systems 660 may further generate simulation data (e.g., motion and position of an object over time) for use by other elements of system 600 or that can be stored in object library 620. The generated simulation data may be combined with or used in addition to animation data generated by the one or more object animation systems 650. The one or more object simulation systems 660 may be configured to allow a user to associate additional information, metadata, color, lighting, rigging, controls, or the like, with all or a portion of the generated simulation data.

The one or more object rendering systems 670 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 670 may be invoked by or used directly by a user of the one or more design computers 610 and/or automatically invoked by or used by one or more processes associated with the one or more design computers 610. One example of a software program embodied as the one or more object rendering systems 670 can include PhotoRealistic RenderMan, or PRMan, produced by Pixar Animations Studios of Emeryville, California.

In various embodiments, the one or more object rendering systems 670 can be configured to render one or more objects to produce one or more computer-generated images or a set of images over time that provide an animation. The one or more object rendering systems 670 may generate digital images or raster graphics images.

In various embodiments, a rendered image can be understood in terms of a number of visible features. Some examples of visible features that may be considered by the one or more object rendering systems 670 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 670 may further render images (e.g., motion and position of an object over time) for use by other elements of system 600 or that can be stored in object library 620. The one or more object rendering systems 670 may be configured to allow a user to associate additional information or metadata with all or a portion of the rendered image.

FIG. 7 is a block diagram of computer system 700. FIG. 7 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 700 and any of its components or subsystems can include hardware and/or software elements configured for performing methods described herein.

Computer system 700 may include familiar computer components, such as one or more one or more data processors or central processing units (CPUs) 705, one or more graphics processors or graphical processing units (GPUs) 710, memory subsystem 715, storage subsystem 720, one or more input/output (I/O) interfaces 725, communications interface 730, or the like. Computer system 700 can include system bus 735 interconnecting the above components and providing functionality, such connectivity and inter-device communication The one or more data processors or central processing units (CPUs) 705 can execute logic or program code or for providing application-specific functionality. Some examples of CPU(s) 705 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 710 can execute logic or program code associated with graphics or for providing graphics-specific functionality. GPUs 710 may include any conventional graphics processing unit, such as those provided by conventional video cards. In various embodiments, GPUs 710 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 710 may include any number of registers, logic units, arithmetic units, caches, memory interfaces, or the like.

Memory subsystem 715 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 715 can include data and program code 740.

Storage subsystem 720 can also store information using machine-readable articles, information storage devices, or computer-readable storage media. Storage subsystem 720 may store information using storage media 745. Some examples of storage media 745 used by storage subsystem 720 can include floppy disks, hard disks, optical storage media such as CD-ROMS, DVDs and bar codes, removable storage devices, networked storage devices, or the like. In some embodiments, all or part of data and program code 740 may be stored using storage subsystem 720.

The one or more input/output (I/O) interfaces 725 can perform I/O operations. One or more input devices 750 and/or one or more output devices 755 may be communicatively coupled to the one or more I/O interfaces 725. The one or more input devices 750 can receive information from one or more sources for computer system 700. Some examples of the one or more input devices 750 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 750 may allow a user of computer system 700 to interact with one or more non-graphical or graphical user interfaces to enter a comment, select objects, icons, text, user interface widgets, or other user interface elements that appear on a monitor/display device via a command, a click of a button, or the like.

The one or more output devices 755 can output information to one or more destinations for computer system 700. Some examples of the one or more output devices 755 can include a printer, a fax, a feedback device for a mouse or joystick, external storage systems, a monitor or other display device, a communications interface appropriately configured as a transceiver, or the like. The one or more output devices 755 may allow a user of computer system 700 to view objects, icons, text, user interface widgets, or other user interface elements. A display device or monitor may be used with computer system 700 and can include hardware and/or software elements configured for displaying information.

Communications interface 730 can perform communications operations, including sending and receiving data. Some examples of communications interface 730 may include a network communications interface (e.g. Ethernet, Wi-Fi, etc.). For example, communications interface 730 may be coupled to communications network/external bus 760, such as a computer network, a USB hub, or the like. A computer system can include a plurality of the same components or subsystems, e.g., connected together by communications interface 730 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 700 may also include one or more applications (e.g., software components or functions) to be executed by a processor to execute, perform, or otherwise implement techniques disclosed herein. These applications may be embodied as data and program code 740. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 715 and/or storage subsystem 720.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A computer-implemented method comprising:
receiving a set of input values for posing an initial mesh defining a surface of a three-dimensional object;
providing the set of input values to a neural network trained based upon training posed meshes generated using a rigging model to generate mesh offset values defined in three-dimensional space based upon the set of input values and the initial mesh, the neural network comprising an input layer, an output layer, and a plurality of intermediate layers;
generating, by the output layer of the neural network, a set of offset values corresponding to a set of three-dimensional target points based on the set of input values;
applying the offset values to the initial mesh to generate a posed mesh; and
outputting the posed mesh for generating an animation frame, wherein the neural network is trained by:

executing the rigging model based upon a set of training values to pose a training input mesh to generate a training deformed mesh;

providing the set of training values as input to the input layer of the neural network;

generating, based on output of the neural network, a training estimated mesh; and updating parameters of the neural network to minimize a loss function between the training estimated mesh and the training deformed mesh.

2. The method of claim 1, further comprising repeating the training using multiple training deformed meshes corresponding to two or more of:

mesh position values generated for an animation using the rigging model;

mesh position values generated by manipulating the training input mesh for a predetermined set of poses;

mesh position values generated by manipulating a rig-control variable between minimum and maximum values; and mesh position values generated by manipulating a subset of the training input mesh using the rigging model.

3. The method of claim 1, wherein the training input mesh is substantially the same as the initial mesh.

4. The method of claim 1, wherein the intermediate layers of the neural network comprise one or more skip connections.

5. The method of claim 1, wherein the points of the set of three-dimensional target points are generated substantially simultaneously.

6. The method of claim 1, wherein:

an intermediate layer adjacent to the output layer generates a set of weights; and the output layer applies the set of weights to a respective set of blendshapes for generating the offset values for the posed mesh, wherein the set of blendshapes are a subset of possible blendshapes selected using principal component analysis.

7. The method of claim 6, wherein a width of the intermediate layer adjacent to the output layer is equal to a number of components used for the principal component analysis.

8. The method of claim 1, wherein the method is performed in less than about 10 milliseconds.

9. The method of claim 1, wherein the object is a character and wherein the initial mesh is a facial mesh defining a face of the character.

10. A system for performing animation, the system comprising one or more processors configured to:

receive a set of input values for posing an initial mesh defining a surface of a three-dimensional object;

provide the set of input values to a neural network trained based upon training posed meshes generated using a rigging model to generate mesh offset values defined in three-dimensional space based upon the set of input values and the initial mesh, the neural network comprising an input layer, an output layer, and a plurality of intermediate layers;

generate, by the output layer of the neural network, a set of offset values corresponding to a set of three-dimensional target points based on the set of input values;

applying the offset values to the initial mesh to generate a posed mesh; and output the posed mesh for generating an animation frame, wherein:

an intermediate layer adjacent to the output layer generates a set of weights; and the output layer applies the set of weights to a respective set of blendshapes for generating the offset values for the posed mesh.

11. The system of claim 10, further comprising training the neural network by:

executing the rigging model based upon a set of training values to pose a training input mesh to generate a training deformed mesh;

providing the set of training values as input to the input layer of the neural network;

generating, based on output of the neural network, a training estimated mesh; and updating parameters of the neural network to minimize a loss function between the training estimated mesh and the training deformed mesh.

12. The system of claim 11, further comprising repeating the training using multiple training deformed meshes corresponding to two or more of:

mesh position values generated for an animation using the rigging model;

mesh position values generated by manipulating the training input mesh for a predetermined set of poses;

mesh position values generated by manipulating a rig-control variable between minimum and maximum values; and mesh position values generated by manipulating a subset of the training input mesh using the rigging model.

13. The system of claim 11, wherein the training input mesh is substantially the same as the initial mesh.

14. The system of claim 10, wherein the intermediate layers of the neural network comprise one or more skip connections.

15. The system of claim 10, wherein the points of the set of three-dimensional target points are generated substantially simultaneously.

16. The system of claim 10, wherein:

the set of blendshapes are a subset of possible blendshapes selected using principal component analysis.

17. The system of claim 16, wherein a width of the intermediate layer adjacent to the output layer is equal to a number of components used for the principal component analysis.

18. The system of claim 10, wherein the receiving, providing, generating, and outputting are performed in less than about 10 milliseconds.

19. The system of claim 10, wherein the object is a character and wherein the initial mesh is a facial mesh defining a face of the character.

* * * * *